Nov. 19, 1935.   S. H. GIBBON   2,021,721
TREATMENT OF RICE, RICE OFFALS OR PADDY AND THE LIKE
Filed July 14, 1934
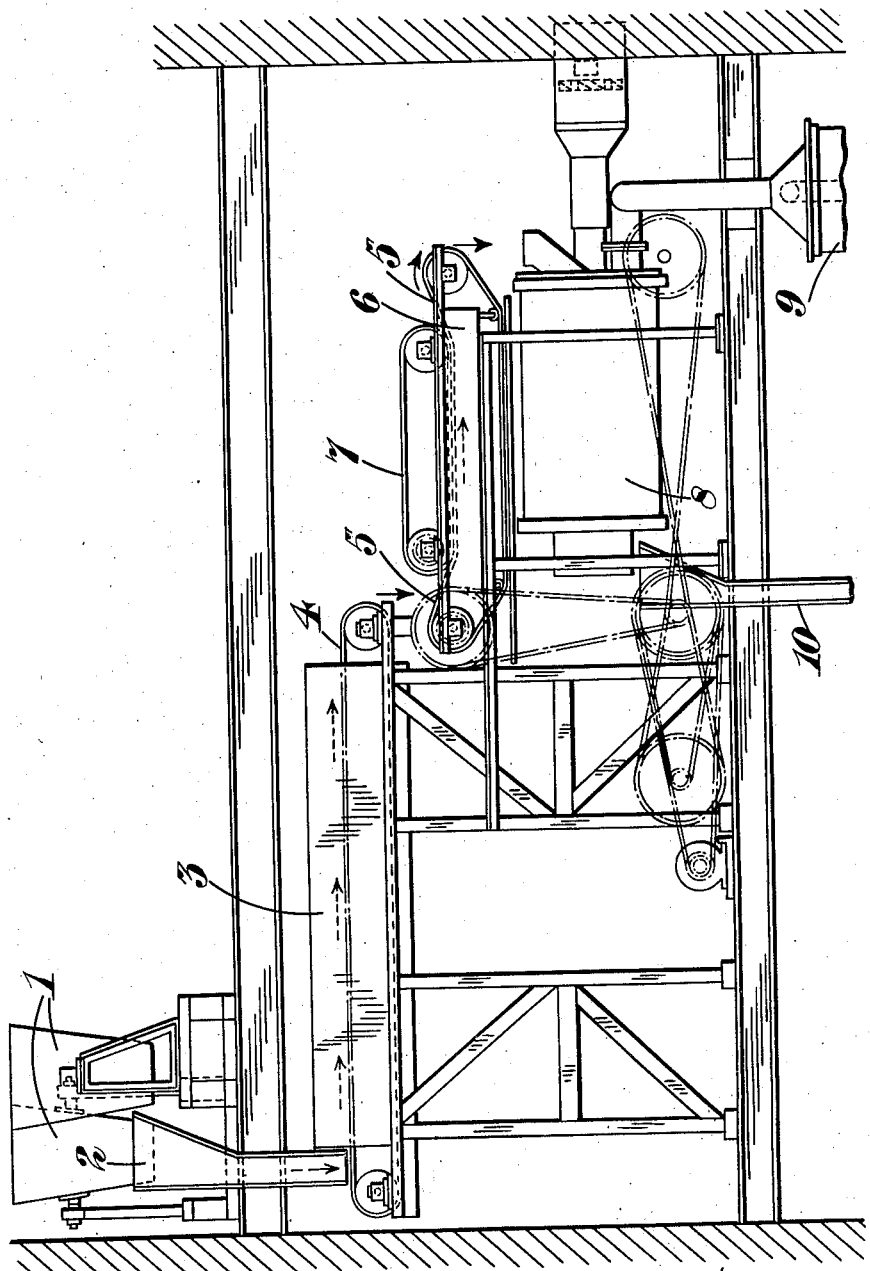
Inventor:
Sam Harrison Gibbon,
By Byrnes, Stebbins & Blenko
attys.

Patented Nov. 19, 1935

2,021,721

UNITED STATES PATENT OFFICE 2,021,721

TREATMENT OF RICE, RICE OFFALS OR PADDY, AND THE LIKE

Sam Harrison Gibbon, London, England, assignor of one-half to Steel Brothers & Company Limited, London, England, a British company Application July 14, 1934, Serial No. 735,273
In Great Britain July 14, 1933

5 Claims. (Cl. 99—11)

This invention relates to the treatment of rice whether in the unhusked condition (i. e. in the form usually referred to as paddy) or after husking and also to milled rice and to rice offals.

This invention provides a step in the processing of rice which consists in subjecting it to a temperature below the freezing point of water, for example about —40° C.

The invention also includes a step in the processing of rice for improving its food value, which consists in subjecting it, while in a condition in which its water content is upwards of about 20%, to the action of a refrigerating medium whereby the temperature of the rice is reduced substantially below the freezing point of water.

The complete process according to the invention may consist in first augmenting the natural water content of the rice (whether husked or unhusked) to a total of 15% to 30%, then maintaining it for some minutes at a temperature substantially below the freezing point of water (e. g. —40° C.) and thereafter passing the rice through hot water preferably at or near boiling point.

In one form the process consists in first soaking the rice in warm water (e. g. at about 70° C.) for say 4 to 6 hours, then maintaining it for a short period, say 5 to 10 minutes, at a temperature substantially below the freezing point of water (e. g. —35° C. to —45° C.), thereafter passing the rice through water at or near boiling point, and finally drying it.

The invention also includes plant for the processing of rice, comprising in combination a soaking tank (or tanks), a refrigerating chamber, means for feeding rice from the soaking tank to the refrigerating chamber, a conveyor arranged to move the rice through the refrigerating chamber, a water trough and associated heating means and a conveyor arranged to receive the rice after passage through the refrigerating chamber and to carry it through the water trough.

In the ordinary process for the preparation of parboiled rice, the paddy is first soaked in water, steamed by saturated steam, and then mechanically dried, the complete process occupying a considerable length of time. It is contemplated that the process according to this invention, which is of much shorter duration, may be used in place of the normal parboiling operation to confer somewhat similar or other beneficial effects on the rice grain, and in particular an improvement in quality.

One effect of treating rice by the process according to this invention is to improve the food value of the product. Most rice in its initial form is quite brittle and of somewhat chalky appearance, whereas after processing according to the present invention it has a light gelatinous appearance whereas the normal parboiling method gives a yellow appearance to the rice.

It is believed that the effect of subjecting the rice to a temperature below the freezing point of water and subsequently passing it through hot water at or near boiling point is to burst or break the starch corpuscle. In the samples of rice which I have employed in carrying out the freezing process the natural water content of the rice grain has been in the region of 10% to 12%. I have been unable to obtain satisfactory results without in the first place subjecting the rice to a soaking in warm water for a time sufficient to bring up the water content to a value in the region of 25% to 30%. It may be, however, that the natural content of rice from other sources produced under other conditions may be in itself sufficient to ensure that the freezing operation will produce the desired result. It is therefore a matter for preliminary experiment to determine, for the particular product employed, the necessary water content which the rice should possess before "freezing" and consequently the conditions under which the initial soaking, if necessary, should be carried out. The water content of the rice prior to "freezing" and the temperature to which the rice is reduced and the time for which it is maintained at the reduced temperature are co-related factors, and it is believed that by increasing the freezing effect satisfactory results may be obtained with rice containing a smaller water content and therefore entailing a preliminary soaking operation of shorter duration. Again, by extending the time taken for the passage of the rice through the refrigerating chamber it is possible to operate with higher temperatures in the chamber.

An example according to the invention will now be described. The process according to this example was carried out on Burma rice in an unhusked condition and having a natural water content of 11.2%. The first step in the process consisted in bringing the water content up to 25% to 30% by soaking the rice in warm water at 70° C. for about 5 hours. The soaked rice was then maintained for a short time at a temperature of about —40° C. and immediately thereafter was passed through boiling water and then dried. This process was carried out in an apparatus which is diagramatically illustrated in the accompanying drawing. This apparatus comprises tanks 1 for the initial soaking operation, a hopper 2 for receiving the rice from the soaking tanks, a freezing chamber 3 for receiving the rice delivered by the hopper 2, and an endless band conveyor 4 for moving the rice through the refrigerating chamber. An ammonia-absorption plant was used for attaining the necessary reduction in temperature within the chamber. The conveyor 4 was driven at such a speed that the rice spread out in a thin layer on the upper lap of the conveyor band and took about 7 minutes in which to pass through the chamber. The conveyor 4 was arranged to deliver the rice, after passage through the chamber 3, on to one end of a conveyor 5 associated with a hot water tank 6. An endless apron 7 was arranged above the conveyor 5 so that the rice was carried through the hot water tank 6 in a thin layer sandwiched between the upper lap of the conveyor 5 and the lower lap of the apron 7. The tank 6 was filled with water maintained at boiling point by means of a gas heater positioned below the tank. The drive to the conveyor 5 and apron 7 was so arranged that the rice took about 1 minute in which to pass through the hot water tank. It is to be understood that the adjacent laps of the conveyor 5 and apron 7 are so positioned as to be below the upper level of the water in the tank. The rice, as it was carried out of the hot water tank 6, was fed into a rotary drier 8 supplied with hot air from a heater 9. The dried rice was finally discharged by a chute 10 into any convenient storage space. After this treatment any of the usual operations such as milling and brushing may be effected in the usual way. In one test by the method, and with the apparatus, described above it was found that the "frozen" rice, on passing through the hot water tank 6, lost 0.5% of its moisture content.

In what has been found to be a convenient practical form of the process, the initial soaking of the rice in warm water and the final passage of the "frozen" rice through boiling water are essential steps. Modifications may, however, be made in these steps of the process without departing from the scope of the invention. For example, it is within the invention to treat the "frozen" rice with hot air or steam, and it is not essential that this treatment should follow directly upon the freezing operation. It is to be understood that the invention includes any process of treating rice (either husked or unhusked) for improving its food value or obtaining other or like benefits, which comprises subjecting the rice to a temperature which is below the freezing point of water.

I claim:—

1. A process for the treatment of rice which consists in first augmenting its water content to 15% to 30%, then subjecting it to a temperature substantially below the freezing point of water and thereafter heating the rice by passing it through hot water.

2. A process for the treatment of rice which consists in first augmenting its water content to 15% to 30%, then subjecting it to a temperature not higher than −35° C., and thereafter heating the rice by passing it through hot water.

3. A process for the treatment of rice which consists in first augmenting its water content to 15% to 30%, then subjecting it to a temperature not higher than −35° C., and thereafter heating the rice by passing it through water at or near the boiling point.

4. A process for the treatment of rice which consists in first soaking it in warm water for 4 to 6 hours, then maintaining it for 5 to 10 minutes, at a temperature substantially below the freezing point of water, thereafter passing the rice through hot water, and finally drying it.

5. A process for the treatment of rice which consists in first soaking it in water at about 70° C. for 4 to 6 hours, then maintaining it for 5 to 10 minutes at a temperature not higher than −35° C., thereafter passing the rice through water at or near the boiling point, and finally drying it.

SAM HARRISON GIBBON.